Figure 1:
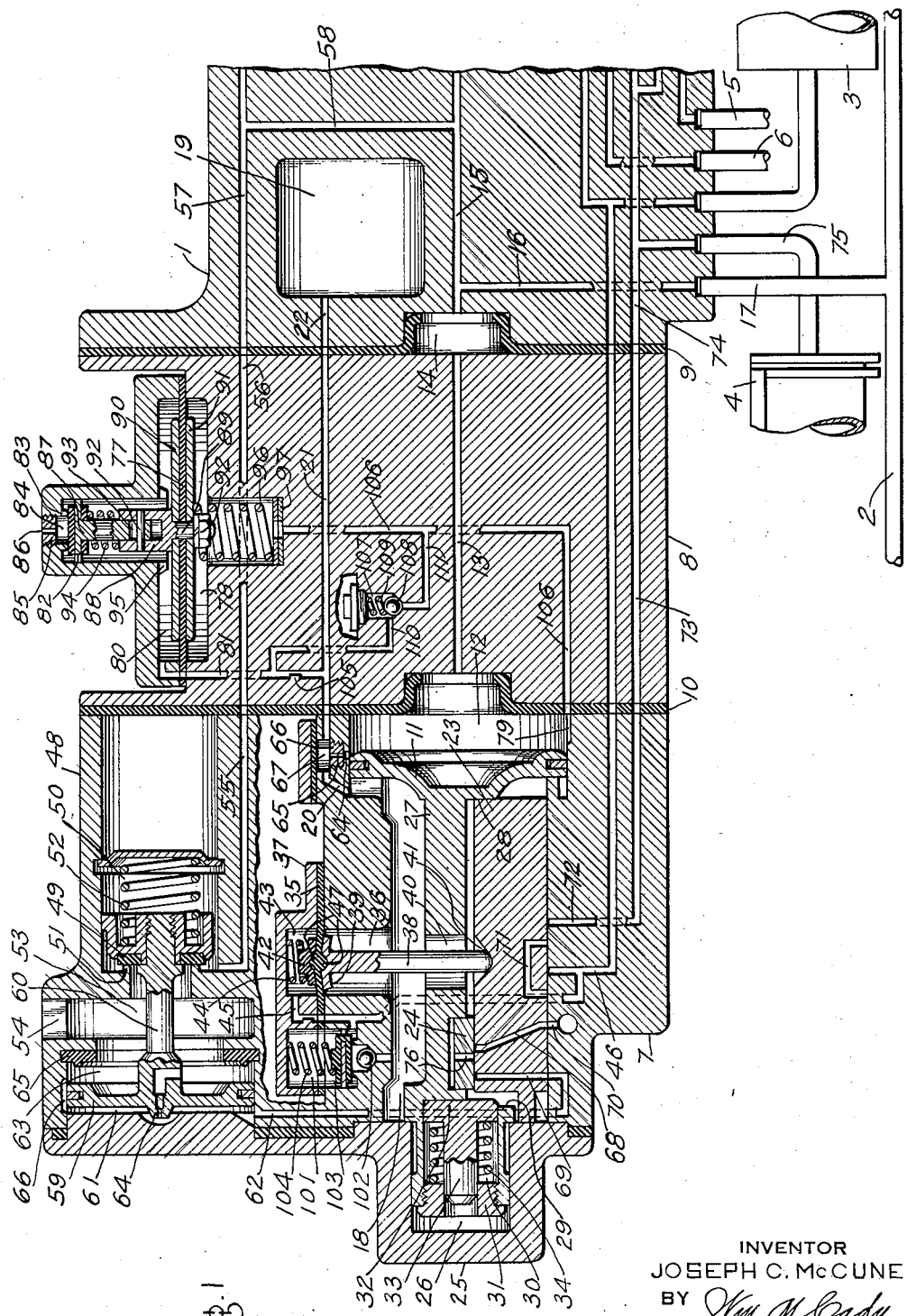

July 20, 1937.  J. C. McCUNE  2,087,622
FLUID PRESSURE BRAKE
Filed Nov. 12, 1935  2 Sheets-Sheet 1

INVENTOR
JOSEPH C. McCUNE
BY Wm. M. Cady
ATTORNEY

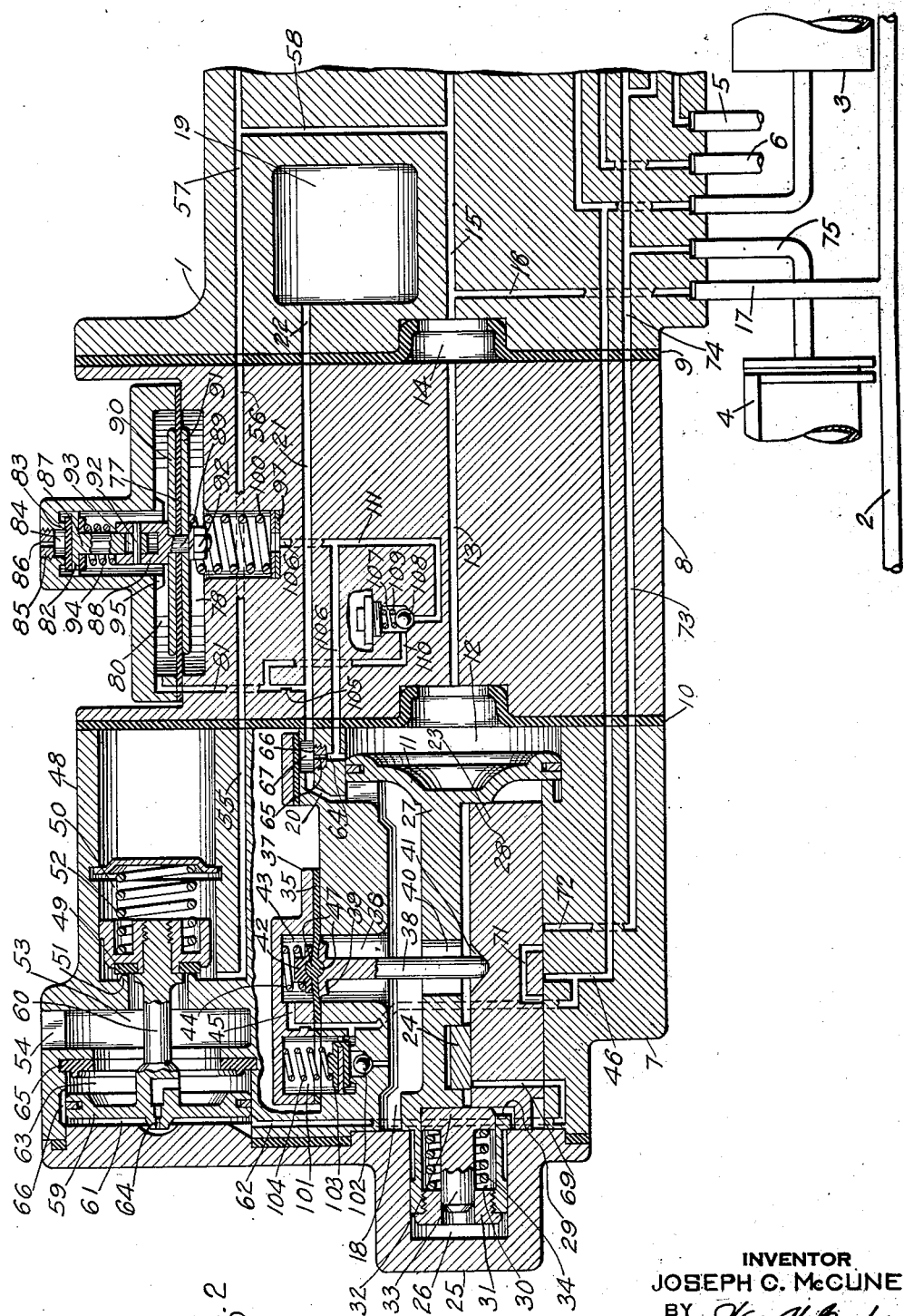

Patented July 20, 1937

2,087,622

UNITED STATES PATENT OFFICE 2,087,622

FLUID PRESSURE BRAKE

Joseph C. McCune, Edgewood, Pa., assignor to The Westinghouse Air Brake Company, Wilmerding, Pa., a corporation of Pennsylvania Application November 12, 1935, Serial No. 49,335

46 Claims. (Cl. 303—42)

This invention relates to fluid pressure brake equipment and more particularly to the type adapted to operate upon a reduction in brake pipe pressure to effect an application of the brakes.

In Patent No. 2,031,213 issued to Clyde C. Farmer on February 18, 1936, a brake controlling valve device is disclosed which comprises a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

This emergency portion comprises a piston subject to the opposing pressures of the brake pipe and a quick action chamber, and further comprises a main slide valve and auxiliary slide valve mounted on the main slide valve, these slide valves being controlled by said piston.

Upon a service reduction in brake pipe pressure this piston is adapted to move the auxiliary slide valve relative to the main slide valve to a service position in which communication is established between the quick action chamber and the atmosphere, and through which the pressure of fluid in the quick action chamber is adapted to be reduced at such a rate relative to the service rate of reduction in brake pipe pressure, as will prevent obtaining a sufficient differential of pressures on said piston to move said piston past the service position. This communication is of such restricted flow area that the quick action chamber pressure is reduced only at a service rate, so that when the brake pipe pressure is reduced at a more rapid or emergency rate, a sufficient differential of pressures is obtained on said piston to move said piston and thereby the auxiliary slide valve to emergency position to effect an emergency application of the brakes.

In the equipment above referred to the emergency portion is designed to be moved to emergency position when a small differential of pressures, such for instance as one pound, is obtained on the emergency piston in order to obtain prompt response of said piston to an emergency reduction in brake pipe pressure and thereby provide for fast serial transmission of emergency operation throughout a train. The piston and auxiliary slide valve of the emergency portion are so proportioned however, that a very light differential of pressures on the piston, such for instance as 0.4 of a pound, will shift these parts to service position, and a spring pressed plunger is provided to define the service position, and the pressure of the spring has to be overcome in order that the piston and valve will move to emergency position. This construction provides a margin between the service and emergency pressure differentials, as governed by the pressure of the spring just mentioned, which is considered to be more than adequate to prevent undesired movement of the parts to emergency position.

Under all normal conditions this emergency portion will function as above described and therefore in the manner intended. If, however, foreign matter should collect around the piston or auxiliary slide valve and increase the static friction or resistance to movement of these parts, it is possible that even upon a service reduction in brake pipe pressure, movement of these parts from the normal position may be so delayed upon a service reduction in brake pipe pressure as to obtain the differential required to move the parts to emergency position before the parts start to move. Then when the parts start moving, if the kinetic friction is relatively low, the parts may jump from their normal position through service position directly to emergency position and thereby initiate an emergency reduction in brake pipe pressure. An emergency application of the brakes will then be obtained throughout the train when not intended. This is undesirable for various reasons, such as, it will interfere with the operating schedule of the train and may also interfere with the operation of other trains on the same track.

The principal object of this invention is to provide means, adapted to be associated with a brake equipment of the type disclosed in the above mentioned patent for obviating the possibility of obtaining upon a service reduction in brake pipe pressure an undesired emergency application of the brakes, as above described.

Other objects and advantages will be apparent from the following, more detailed description of the invention.

In the accompanying drawings; Fig. 1 is a diagrammatic view, mainly in section, of a portion of a fluid pressure brake equipment embodying one form of the invention; and Fig. 2 is a view similar to Fig. 1 embodying another form of the invention.

The portion of a fluid pressure brake equipment shown in the drawings is fundamentally the same as a portion of the equipment disclosed in the aforementioned patent, but only those parts are shown which are deemed necessary to a comprehensive understanding of the invention.

The fluid pressure brake equipment shown in Fig. 1 comprises a pipe bracket 1, only a portion of which is shown, to which is connected a brake pipe 2, an emergency reservoir 3 and a brake cylinder 4, and this bracket is provided with connections to a pipe 5 which leads to an auxiliary reservoir (not shown) and to a brake release pipe 6 which is connected to a retaining valve device (not shown), this construction corresponding substantially to that disclosed in the aforementioned patent.

An emergency valve device 7 is provided which comprises the main elements of that disclosed in the aforementioned patent. This device is mounted on one face of a filler block 8 which, according to the invention, is interposed between the emergency valve device 7 and pipe bracket 1 and is secured to said pipe bracket, with a gasket 10 interposed between the emergency valve device 7 and filler block 8 and a like gasket 9 interposed between the filler block 8 and pipe bracket 1.

The emergency valve device 7 comprises a casing containing an emergency piston 11 having at one side a chamber 12 which is connected to the brake pipe 2 by way of a passage 13 in the filler block 8, a chamber 14 and passages 15 and 16 in the pipe bracket 1 and a branch pipe 17. The piston has at the opposite side a valve chamber 18 which is connected to a quick action chamber 19 in the pipe bracket 1 by way of a passage 20 in the emergency valve device, a passage 21 in the filler block 8 and a passage 22 in the pipe bracket 1, and disposed in this valve chamber is a main slide valve 23 and an auxiliary slide valve 24 adapted to be operated by the piston 11.

The left hand end of the valve chamber 18 is closed by a cover plate 25 in which there is provided a bore 26 arranged axially with respect to the piston 11. The piston 11 has a stem 27, the end of which is slidably mounted in the bore 26. The stem has a recess in which the auxiliary slide valve 24 is disposed, while the main slide valve is disposed between a shoulder 28 formed on the back of the piston 11 and a shoulder 29 formed on the stem 27.

A bore 30 is provided in the end of the piston stem 27, the outer end of this bore being closed by a plug 31 while the inner end of the bore extends beyond the shoulder 29 in a direction toward the piston 11. A plunger 32 is disposed in this bore and has a stem 33 slidably mounted in a suitable bore in the plug 31. A spring 34 is interposed between the plug 31 and plunger 32 and acts to urge said plunger into engagement with the inner end of the bore 30, in which position the right hand face of said plunger is disposed between the shoulder 29 and adjacent end of the main slide valve 23.

A flexible diaphragm 35 is secured to the casing 7, over an opening 36 leading to the valve chamber 18, by means of a cover 37. A rocking pin 38, having a head 39 engaging one side of the diaphragm 35, extends through the opening 36 and a slot 40 in the piston stem 27 and into engagement with the main slide valve 23 within a recess 41. A follower 42 is disposed in a chamber 43 formed in the cover 37 at the opposite side of the diaphragm 35 and is pressed into engagement with said diaphragm by means of a spring 44. The chamber 43 is connected to a passage 45 which leads to a passage 46 which is connected to the emergency reservoir 3. The diaphragm 35 is provided on both sides with opposite raised portions 47 which fit into recesses in the pin head 39 and follower 42 for holding said head and follower in the proper working positions on the diaphragm.

The emergency valve casing is provided with a check valve chamber 101 which is open at one end to the emergency valve chamber 18 and which is connected to the emergency reservoir passage 45. A seat is provided in chamber 101 for a ball check valve 102 and another seat for a poppet type check valve 103, these check valves being arranged in series to prevent flow of fluid under pressure from the emergency reservoir passage 45 to the emergency valve chamber 18. A spring 104 in chamber 101 acts on the poppet valve 103 for urging same to its seat.

A brake pipe vent valve device 48 is associated with the emergency valve device 7 and comprises a vent valve 49 contained in a chamber 50 and urged into engagement with a seat rib 51 by means of a spring 52 for closing communication between said chamber and a chamber 53 which is open to the atmosphere through a passage 54. The chamber 50 is in constant communication with the brake pipe 2 through a passage 55 in the vent valve device, a passage 56 in the filler block 8, passages 57, 58, 15 and 16 in the pipe bracket 1 and branch pipe 17.

The vent valve device 48 further comprises a movable piston 59 having a stem 60 which extends through the chamber 53 and which is secured to the vent valve 49. This piston has at one side a chamber 61 connected to a passage 62 which leads to the seat of the main slide valve 23 and has at the opposite side a chamber 63 open to chamber 53. A restricted port 64 is provided through the piston 59 connecting chamber 61 to chamber 63. A gasket 65 is provided in the casing at the right hand side of the piston 59 and is adapted to be engaged thereby when said piston is moved toward the right hand. A leakage groove 66 is provided in the casing for connecting chamber 61 to chamber 63 when the piston 59 is in its normal position, as shown in the drawings.

In the drawings, the parts of the emergency valve device 7 are shown in their normal position and in this position, a passage 64 in the casing is open to chamber 12 past the piston 11. This passage communicates with a restricted port 65 in a choke plug 66, which port in turn leads to a chamber 67 which is connected through passage 20 to the emergency valve chamber 18 on the one hand and through passages 21 and 22 to the quick action chamber 19 on the other hand.

The main slide valve 11 is provided with passages 68 and 69 which in the normal position of said slide valve, as shown in the drawings, register with an atmospheric passage 70 and the passage 62, respectively, and is further provided with a cavity 71 adapted in the emergency position thereof, which will be hereinafter described, to connect the emergency reservoir passage 46 to a passage 72 which is connected to the brake cylinder 4 by way of passage 73 in the filler block 8, passage 74 in the pipe bracket 1 and pipe 75. Also in the emergency position of the slide valve 23, the passage 62 is adapted to be connected past the left hand end of said slide valve to the valve chamber 18.

The auxiliary slide valve 24 normally laps the passages 68 and 69 which open at the seat of said valve, and a service or breather port 76 is provided through said valve and is adapted upon movement of said valve toward the right hand to register fully with port 68 before said valve commences to uncover the passage 69.

When the service position of the valves is attained the port 76 is in substantially full registration with passage 68, and at the time of this registration, the plunger 32 is adapted to just engage the left hand end of the main slide valve 23 and therefore define this service position. Further movement of the auxiliary slide valve towards the right hand to uncover the emergency passage 69 is then opposed by the spring 34 which necessitates an increase in the differential of pressures on the piston 11 in order to overcome the pressure of said spring, as will be evident.

The equipment so far described corresponds substantially to that disclosed in the patent hereinbefore referred to except for the filler block 8 which according to the invention has been interposed between the pipe bracket 1 and emergency valve device 7, and it will be evident from the above description of parts that passages have been provided through this filler block to establish communications between the emergency valve device and pipe bracket corresponding to those disclosed in the aforementioned patent.

According to the invention, the filler block 8 is provided for the purpose of incorporating in the equipment a valve device designed to prevent undesired emergency operation of the emergency valve device 7 upon a service reduction in brake pipe pressure.

The valve device in the filler block 8 comprises a flexible diaphragm 77 having at one side a chamber 78 which in the normal position of the emergency piston 11 is connected to the brake pipe 2 through a passage 106, a groove 79 in the wall of the cylinder containing said piston, chamber 12, and from thence by way of the brake pipe passage 13, the groove 79 being of such length that when the piston 11 is in engagement with gasket 10 the passage 106 is connected around said piston to the valve chamber 18.

The diaphragm 77 has at the opposite side a chamber 80 which is connected through a passage 81 and a choke 105 to passage 21 which is in constant communication with the quick action chamber 19. A poppet valve 82 adapted to be operated by the diaphragm 77 is disposed in chamber 80 and is adapted to engage a seat rib 83, formed on the filler block around a passage 84, to close communication from chamber 80 to said passage. A choke plug 85 is provided in the passage 84 and has a restricted flow passage 86 leading to the atmosphere, the flow area of this passage 86 corresponding substantially to that through passages 76, 68 and 70, in the slide valves 24 and 23 and the seat of slide valve 23, when said passages are in registration.

The poppet valve 82 is relatively small as compared to the area of the diaphragm 77 and is provided with a stem 87 which telescopes with a member 88 which is provided with a stud 89. This stud extends through a central bore provided in a follower plate 90 engaging one side of the diaphragm 77, through a central opening in said diaphragm and a corresponding opening in a follower plate 91 engaging the opposite side of said diaphragm, and a nut 92 is provided on the end of said stud which pulls the member 88 against the plate 90 and clamps the plates 90 and 91 to the diaphragm 77.

A pin 92 is secured in the member 88 and extends through a slot 93 provided longitudinally through the poppet valve stem 87, while a spring 94 is interposed between said member and poppet valve. Stops 95 are provided on the casing adapted to be engaged by the follower 90 for limiting deflection of the diaphragm 77 in one direction.

A spring 96 is disposed in chamber 78 and acts on follower plate 91 urging the diaphragm 77 in the direction for causing spring 94 to seat the poppet valve 82. Shims 97 are disposed beneath one end of the spring 96 for accurately adjusting its pressure on the diaphragm 77 to the desired value.

The diaphragm 77 is preferably made of relatively thin, flexible material and is preferably as large or larger in diameter than the emergency piston 11 so that the differential of pressures normally required to deflect said diaphragm a certain amount will be only a small percentage of the pressure of the controlling spring 96, thus any change in the internal resistance of the diaphragm due for instance to softening of the diaphragm in the presence of oil or hardening due to aging will not materially change this differential. By this construction, the diaphragm 77, will deflect within a very small range of the exact differential desired as governed by the spring 96.

A valve chamber 107 is provided in the filler block 8 and contains a check valve 108 and a spring 109 of predetermined value acting on the check valve urging it to its seat formed in one end of said chamber. The chamber 107 is connected through a passage 110 to passages 21 and 81, while the lower seated surface of the valve is open to a passage 111 which leads to passage 106.

In operation, the portion of the brake equipment shown in the drawings is initially charged with fluid under pressure in the same manner as described in the aforementioned patent, but will be briefly described here.

Fluid under pressure is supplied to the brake pipe 2 in the usual well known manner and flows therefrom through pipe 17 to the pipe bracket 1, then through passage 16 to passage 15 and through passage 15 in the direction toward the right hand to the service portion of the brake controlling valve device which operates to supply fluid under pressure to the emergency reservoir 3. The service portion of the brake controlling valve device is not shown, however, since it is not involved in the invention.

Fluid under pressure supplied to passage 15 flows in a direction toward the left hand to chamber 14, and thence through passage 13 to the emergency piston chamber 12. With the parts of the emergency valve device in the normal or release position, as shown in the drawings, the charging passage 64 is open to the piston chamber 12 which permits fluid under pressure to flow through said passage and the restricted port 65 in the choke plug 66 to chamber 67 and from thence through passage 20 to the emergency valve chamber 18, and through passages 21 and 22 to the quick action chamber 19.

Fluid under pressure also flows from passage 21 through the choke 105 and passage 81 to diaphragm chamber 80, while diaphragm chamber 78 is charged with brake pipe pressure by flow of fluid under pressure from piston chamber 12 through groove 79 and passage 106. The emergency valve chamber 18, quick action chamber 19 and diaphragm chamber 80 thus become charged together to the pressure carried in the brake pipe and acting in the emergency piston chamber 12 and diaphragm chamber 78. When these chambers are thus charged, the emergency valve parts are in the position shown in the drawings, and the spring 96 acts to hold the diaphragm 77 in such a position that the service vent valve 82 will be maintained seated against the seat rib 83, as shown in the drawings.

With the equipment charged with fluid under pressure, if it is desired to effect a service application of the brakes, a gradual service reduction in pressure in the brake pipe 2 is initiated by operation of the usual brake valve device (not shown). This reduction is transmitted through the branch pipe 17 and passage 16 to passage 15 and from thence in a direction toward the left hand to the emergency piston chamber 12 and in a direction toward the right hand to the service portion (not shown) of the brake equipment, the service portion operating to effect a quick service reduction in brake pipe pressure and to supply fluid under pressure to passage 74 and from thence to brake cylinder 4 in a manner described in the aforementioned patent.

The service reduction in brake pipe pressure acts to reduce the pressure in the emergency piston chamber 12 at a faster rate than the pressure of fluid in the quick action chamber 19 and emergency valve chamber 18 can reduce by flow back to the piston chamber 12 through the restricted port 65 in the choke plug 66.

If the emergency valve device operates as intended, that is, if the static resistance to movement of the piston 11 and auxiliary slide valve 24 is not greater than a predetermined degree, then when the pressure in chamber 12 becomes slightly lower, for instance 0.4 of one pound, than that acting in the emergency valve chamber 18, this pressure differential shifts the piston 11 and auxiliary slide valve 24 towards the right hand, causing port 76 in the auxiliary slide valve 24 to register with passage 68 in the main slide valve 23. Through this port and passage fluid under pressure is adapted to be vented from the quick action chamber 19 and emergency valve chamber 18 to the atmosphere by way of the atmospheric passage 70, and such venting of fluid under pressure is adapted to reduce the pressure acting on the left hand face of the emergency piston 11 at as fast a rate as the opposing brake pipe pressure in chamber 12 is being reduced, and thereby prevents a further increase in pressure differential on the emergency piston 11 which would tend to keep said piston moving on to the emergency position which will be later described.

The emergency piston 11 and auxiliary slide valve 24 are designed to move to the service position just described on a very small differential of pressures, such for instance as 0.4 of one pound as above noted, and to prevent said parts from moving further on a service reduction in brake pipe pressure, the plunger 32 in the end of the piston stem 27 engages the end of the main slide valve 23 at the time port 76 and passage 68 are in full registry. Further movement of the piston and graduating valve therefore necessitates a sufficient increase in pressure differential to compress this spring, which however is prevented, normally, by the venting of fluid under pressure from the emergency valve chamber 18 as above described. The main slide valve 23 necessitates an even greater pressure differential on the piston 11 to be moved than is required to compress the spring 34, so that said main slide valve in conjunction with the pressure of spring 34 on the plunger 32 acts as an effective block for defining the service position of the auxiliary slide valve 24. In this position of the auxiliary slide valve it is desired to point out that passage 69 in the main slide valve 23 is still lapped by the auxiliary slide valve 24.

If only a partial service reduction in brake pipe pressure is effected, then when the pressure in the emergency valve chamber becomes reduced sufficiently below brake pipe pressure, the higher brake pipe pressure in the emergency piston chamber 12 moves the emergency piston 11 and auxiliary slide valve 24 toward the left hand until the passage 68 in the main slide valve is lapped so as to prevent further venting of fluid under pressure from the valve chamber 18.

If when the brake equipment is in the normal or release position, a sudden emergency reduction in brake pipe pressure is effected, such a reduction causes the service portion (not shown) of the brake equipment to operate to supply fluid under pressure to the brake cylinder as described in the aforementioned patent. The emergency reduction in brake pipe pressure promptly reduces the pressure in the emergency piston chamber 12 and causes the piston 11 and graduating valve 24 to move toward the right hand to service position hereinbefore described. In this position, the pressure in the emergency valve chamber cannot reduce through port 76 and passage 68 as fast as the brake pipe pressure in piston chamber 12 is reducing, so that the pressure differential on piston 11 quickly becomes such as to overcome the pressure of the spring 34 and then moves the piston 11 to the emergency position defined by engagement of the shoulder 29 on the emergency piston stem 27 with the end of the main slide valve 23.

In this position of the auxiliary slide valve, passage 69 in the main slide valve is opened to the valve chamber 18 which permits fluid under pressure to flow from said chamber to passage 62 and from thence to the vent valve piston chamber 61.

This supply of fluid under pressure to piston chamber 61 so exceeds the venting capacity of the leakage groove 66 and the restricted port 64 through the vent valve piston 59, that sufficient pressure is promptly obtained in said chamber on the vent valve piston to move said piston toward the right hand into sealing engagement with gasket 65.

This movement of the vent valve piston 59 unseats the vent valve 49 which permits fluid under pressure to rapidly flow from the brake pipe 2 to the atmosphere through pipe 17, passages 16, 15, 58, 57, 56 and 55, thence through chamber 58 past the valve 49 to chamber 53 and from thence through the atmospheric passage 54. This sudden emergency reduction in brake pipe pressure is transmitted from car to car through a train by the operation of the emergency valve device and vent valve device on each car in the manner above described, as is well understood.

When the brake pipe pressure in the emergency piston chamber 12 becomes reduced sufficiently below the pressure of fluid in the valve chamber 18, that the differential of pressures on the emergency piston can overcome the static resistance to movement of the main slide valve 23, said piston moves said slide valve toward the right hand to a position defined by the engagement of said piston with the gasket 19.

In this position of the emergency slide valve 23, the cavity 71 connects the emergency reservoir passage 46 to the brake cylinder passage 72 so that fluid under pressure is permitted to flow from the emergency reservoir 3 to the brake cylinder 4 for producing high emergency brake cylinder pressure as is obtained in the apparatus of the aforementioned patent. Also in this position of the main slide valve the passage 62 is opened to the emergency valve chamber 18 past the left hand end of the slide valve in order to maintain the supply of fluid under pressure to the vent valve piston chamber 61.

Fluid under pressure thus supplied to the vent valve piston chamber 61 gradually flows to the atmosphere through the restricted vent port 64 in the vent valve piston 59. The size of this port is so proportioned to the volume of the emergency valve chamber 18 and quick action chamber 19 that sufficient pressure will be maintained on the piston 59 to hold the vent valve 49 unseated against the pressure of spring 52 until the brake pipe pressure is reduced to substantially atmospheric pressure, after which said spring acts to seat the vent valve 49 so as to permit the brake pipe to be recharged for effecting a release of the brakes, whenever it is desired.

In effecting an emergency application of the brakes, the emergency piston 11 is adapted to move the auxiliary slide valve 24 first to service position upon obtaining a small differential of fluid pressures, such as 0.4 of one pound on the emergency piston 11, the same as upon a service reduction in brake pipe pressure. Then a slight increase in differential, such as 0.6 of a pound, is required on the piston 11 to overcome the pressure of spring 34 for moving the auxiliary slide valve 24 to the emergency position. In other words, about 1 pound differential is required to move the piston 11 and valve 24 to emergency position as above described, and it should be noted, that this differential is obtained so quickly that movement of the parts from the normal position to emergency position is effected so rapidly that there is no actual stopping of the parts in the service position.

It is possible that foreign matter may accumulate in a brake controlling valve device and act to increase the force necessary to start a valve or piston moving, but after the valve or piston is started the force necessary to keep the valve or piston moving may be relatively low. Assuming that the parts of the emergency valve device are designed to be moved on the pressure differentials above mentioned, it will be evident that if the static resistance to movement of the emergency piston 11 and auxiliary slide valve 24 does not require a differential of pressure on said piston equal to the one pound, above mentioned, to start said piston and valve moving, the action of spring 34 will prevent undesired movement to emergency position upon a service reduction in brake pipe pressure, but if the static resistance becomes such as to require a pressure differential greater than said one pound to start said piston and valve moving, this greater differential plus the inertia of the moving piston and valve will be sufficient to overcome the pressure of spring 34 and move the valve to emergency position, in which case an emergency application of the train brakes would result, upon effecting a service reduction in brake pipe pressure, which is undesired.

The valve device disposed in the filler block 8 is provided to prevent this undesired operation of the emergency valve device and is designed to operate at a differential of pressures, which if allowed to accumulate on the emergency piston due to failure of the emergency piston to move as intended, would be liable to cause said piston to move to emergency position when not desired.

With this valve device, the pressures in the diaphragm chambers 78 and 80 vary with those in the connected emergency valve chamber 18 and quick action chamber 19, and in the piston chamber 12 or brake pipe 2, respectively, so long as the emergency valve device is not in emergency position. The spring 96 is so designed with respect to the area of the diaphragm 77 as to prevent any downward deflection of said diaphragm upon a service reduction in pressure in the brake pipe and therefore in chamber 78, unless the differential between quick action chamber pressure in chamber 80 and brake pipe pressure in chamber 78 becomes equal to substantially that which will cause the emergency valve device 7 to operate to effect an undesired emergency application of the brakes. If the differential increases to substantially this amount, or say one pound as above described, then this differential acting on the diaphragm 77 overcomes the pressure of spring 96 and deflects said diaphragm downwardly which acts through the member 88, pin 92 and stem 87 to pull the valve 82 away from the seat rib 83. With the valve 82 thus unseated, fluid under pressure is vented from the emergency valve chamber 18 and quick action chamber 19 through the restricted port 86 to the atmosphere at such a rate that the reduction in pressure in the emergency valve chamber and quick action chamber promptly acts to prevent any further increase in the differential of pressures on the emergency piston. By thus limiting the pressure differential which it is possible to obtain on the emergency piston 11 to a degree which will not be sufficient to move said piston and the auxiliary slide valve 24 to emergency position, undesired movement of the emergency piston and auxiliary slide valve 24 to emergency position upon a service reduction in brake pipe pressure is prevented.

If, as above described, the piston 11 and auxiliary slide valve 24 do not move from release position upon effecting a service reduction in brake pipe pressure, the valve 82 is held open by the diaphragm 77 until the quick action chamber pressure is reduced substantially the same degree as the brake pipe pressure is reduced, whereupon, spring 96 deflects the diaphragm 77 back to its normal position and causes spring 94 to seat the valve 82.

It will be evident that the valve 82 and choke 86 perform the same function, when the emergency piston and auxiliary slide valve fail to be moved upon a service reduction in brake pipe pressure, as is preformed by the auxiliary slide valve causing port 76 to register with passage 68 when said piston and slide valve operate as intended.

It will be further noted, that the valve device in the filler block 8 does not operate upon a service reduction in brake pipe pressure except in case of failure of the emergency piston 11 and auxiliary slide valve 24 to operate as intended, which in one respect is desirable in that it causes the piston 11 and slide valve 24 to operate when they will, which tends to keep said parts sufficiently free to operate as intended.

When a sudden emergency reduction in brake pipe pressure is effected, the emergency valve device will operate as hereinbefore described regardless of the static friction condition of the piston and valves, since a high differential of pressure is suddenly established over the emergency piston 11 which will promptly move same to emergency position and into sealing engagement with the gasket 10. In this position of the piston 11, diaphragm chamber 78 is disconnected from the piston chamber 12 and connected to the valve chamber 18 through passage 106 and groove 79 which by-passes the piston 11. This provides quick action chamber pressure in diaphragm chamber 78, and since diaphragm chamber 80 is at all times connected to the quick action chamber 19, the opposing fluid pressures on the diaphragm 77 become equal which permits spring 96 to maintain the service vent valve 82 seated. By maintaining the service vent valve seated, the quick action chamber pressure is reduced only through the restricted port 64 in the vent valve piston 59 which ensures that the brake pipe vent valve 49 will be maintained open for the desired time, as hereinbefore fully described.

When it is desired to effect a release of the brakes after an application, fluid under pressure is supplied to the brake pipe 2 in the usual manner and flows from thence to the service portion of the equipment (not shown) and to piston chamber 12 of the emergency valve device 7. The consequent increase in pressure in chamber 12 shifts the piston 11 and slide valves 23 and 24 back to their normal position in which the emergency valve chamber 18 and quick action chamber 19 are recharged with fluid to the normal pressure obtained in the brake pipe, while the service portion of the equipment (not shown) is operated by the increase in brake pipe pressure to effect a release of fluid under pressure from the brake cylinder and to recharge the remaining portion of the equipment in the manner described in the aforementioned patent.

In effecting a release of the brakes, it is customary to initially move the usual brake valve device (not shown) to full release position for supplying fluid at main reservoir pressure directly to the brake pipe 2, and then after a certain lapse of time the brake valve device is moved to running position in which the supply of fluid to the brake pipe is controlled by the usual feed valve device (not shown). As a result, the brake pipe pressure at the head end of the train is initially increased to a degree which may be substantially equal to that carried in the main reservoir. As soon as the emergency valve device 7 is moved to the normal position by the increase in brake pipe pressure, the high brake pipe pressure becomes effective through groove 79 and passage 106 in chamber 78. The diaphragm 77 is thus subjected to this high pressure in chamber 78 and the lower quick action chamber pressure in chamber 80, and to prevent subjecting the seating face of the service vent valve 82 to this differential of pressures on the diaphragm, the diaphragm 77 is permitted to flex or move relatively to said valve into engagement with the stops 95 on the casing without increasing the seating pressure on the service vent valve 82 above that effected by spring 94. This construction avoids damaging the seating face of the valve 82.

In releasing the brakes after an application, the emergency valve chamber 17 and quick action chamber 18, in valve devices on cars at the head of a train, may tend to become charged from the initial high brake pipe pressure to a pressure exceeding that normally carried in the brake pipe. Such overcharging is prevented however by the provision of the check valves 102 and 103 which act to permit fluid under pressure to flow from the emergency valve chamber 17 and quick action chamber 18 to the partially or fully charged emergency reservoir 3, which is of large volume.

In initially charging the equipment the flow of fluid from the emergency valve chamber 17 and quick action chamber 19 to the emergency reservoir 4, which may be at substantially atmospheric pressure, may be at such a rate with respect to the rate of supply to said chamber through the charging port 65 that a very high differential of pressures will be established over the emergency piston 11. It is undesirable that the diaphragm 77 be subjected to such a high differential of pressures, due to the possibility of rupturing the diaphragm, and is avoided by the use of the check valve 108 and spring 109. Just as soon as the brake pipe pressure acting in chamber 12 on the emergency piston 11 and in chamber 78 on one face of the diaphragm 77 becomes increased a certain degree, such for instance as 15 pounds, over the pressure acting in diaphragm chamber 80, the brake pipe pressure unseats the check valve 108 against the pressure of spring 109. Fluid under pressure then flows through passages 110 and 81 into diaphragm chamber 80 at such a rate relatively to the capacity of choke 105 to permit flow from chamber 80 to the emergency valve chamber 17 and quick action chamber 18, as to maintain in chamber 80, during this initial charging, a pressure which is less than brake pipe pressure only by a predetermined amount, governed by the pressure of spring 109. The diaphragm 77 is thus protected against subjection to a differential of pressures exceeding that determined by spring 109 which will prevent possible rupturing of the diaphragm.

While the choke 105 acts to restrict flow of fluid under pressure from chamber 80 to the emergency valve chamber 18 and quick action chamber 19 under the conditions just described, it in no way interferes with the operation of the service vent valve 82 to reduce the pressure in the emergency valve chamber 17 and quick action chamber 19 to prevent undesired movement of the emergency valve device to emergency position upon effecting a service application of the brakes, as hereinbefore described.

In the embodiment of the invention above described, it will be noted that, except for the addition of the groove 79 controlled by the piston 11, no change is required in the emergency valve device disclosed in the aforementioned patent. In other words, the mere provision of the groove 79 in the emergency valve, and the provision of the filler block 8 which carries the diaphragm controlled valve device accomplishes the object of the invention and as hereinbefore pointed out, this embodiment provides that the emergency valve device, if in condition, will always respond to a service reduction in brake pipe pressure, the diaphragm controlled valve device being operative only in case the emergency valve device fails to operate upon the maximum differential which will avoid movement to the emergency position upon a service reduction in brake pipe pressure.

The preferred embodiment of the invention is shown in Fig. 2 of the drawings. In this embodiment, a diaphragm controlled valve device is provided which operates upon every service reduction in brake pipe pressure to vent fluid under pressure from the quick action chamber, while the emergency valve device is designed so as not to operate at all upon a service reduction in brake pipe pressure, this embodiment having certain advantages over that disclosed in Fig. 1 of the drawings, which will be hereinafter described.

The brake equipment shown in Fig. 2 of the drawings differs from that shown in Fig. 1 in the following respects. The service or breather port 76, passage 68 and atmospheric passage 70 in the slide valves 24 and 23 and slide valve seat, respectively, are omitted, thereby eliminating from this emergency valve device the service function contained in the emergency valve device shown in Fig. 1. Furthermore, the piston stem 27 is shortened so that in the normal position of the parts, the plunger 32 engages the rear end of the main slide valve 23. By these modifications the movement of the emergency piston 11 and auxiliary slide valve 24 is reduced by an amount equal to the service movement, or the movement required to shift port 76 into registry with passage 68 in the construction shown in Fig. 1. This will be evident from an inspection of the drawings which clearly shows that the distance between the piston 11 and gasket 12 is less in the device shown in Fig. 2 than that shown in Fig. 1.

The diaphragm controlled valve device disposed in the filler block 8 shown in Fig. 2 is the same as that shown in Fig. 1 except it employs a spring 100 of different value than spring 96 used in the device shown in Fig. 1, and the passage 103 which connects to diaphragm chamber 78 instead of leading to a groove 79 as in Fig. 1, leads to the charging passage 64.

The spring 100, instead of being designed to delay the operation of the diaphragm controlled valve 82 so as to permit the emergency valve device to operate upon a service reduction in brake pipe pressure, if it is in proper condition to do so, is designed to permit the diaphragm controlled valve to operate upon a very low pressure differential such as 0.2 of a pound, which is only one-half that required to move the emergency valve device, disclosed in Fig. 1, to service position.

In the emergency valve device shown in Fig. 2 of the drawings, the differential required to move the piston 13 and auxiliary slide valve 24, will be that required to overcome the static resistance to movement of said piston and valve plus the pressure of spring 34, and assuming these parts to be substantially the same as those employed in the device shown in Fig. 1, this differential may equal approximately one pound when the parts are in normal condition, and may increase beyond this amount in case of foreign matter accumulating around said piston and valve. However, the difference between the one pound differential required to move the piston 11 and slide valve 24 and the 0.2 pound differential required to operate the diaphragm controlled valve 82, ensures that the diaphragm controlled valve will always operate ahead of the emergency valve device upon a service reduction in brake pipe pressure. At this point it should be noted that the 0.2 pound differential required to deflect the diaphragm 77 will not be appreciably effected by variations in internal resistance of the diaphragm since said diaphragm is of relatively large area as compared to the pressure of said spring as has been hereinbefore more fully described. Further, since foreign matter will not materially alter the deflection characteristics of the diaphragm, it will be evident that this 0.2 pound function will remain substantially constant.

Upon effecting a service reduction in brake pipe pressure, such reduction becomes effective in the emergency piston chamber 12 and diaphragm chamber 78 and fluid under pressure then tends to flow back from the quick action chamber 19 and emergency valve chamber 18 through the restricted port 65 in choke 66 to the brake pipe, in the same manner as occurs in the construction shown in Fig. 1 of the drawings. The port 65 so restricts this back flow, however, that 0.2 of a pound differential of pressures is promptly obtained on the diaphragm 77 which deflects said diaphragm against the opposing pressure of spring 100 and thereby unseats the service vent valve 82.

With the valve 82 unseated, fluid under pressure is vented from the quick action chamber 19 and emergency valve chamber 18 at as rapid a rate as the brake pipe pressure is being reduced and thereby prevents an increase in this differential of pressures. Since the differential of pressures is thus prevented from increasing above the substantially 0.2 of a pound and it requires at least one pound differential to start the emergency piston moving, it will be evident that the emergency valve device can never respond to a service reduction in brake pipe pressure.

In case an emergency reduction in brake pipe pressure is effected, the pressure is reduced so rapidly on the emergency piston that the one pound differential is promptly obtained on the emergency piston 11 which operates said piston to shift the auxiliary slide valve 24 to emergency position in which the passage 69 is uncovered. Fluid under pressure then is supplied through said passage to passage 62 and from thence to the vent valve piston chamber 61. The vent valve piston 59 is thereby operated to unseat the vent valve 49 to vent fluid under pressure from the brake pipe, and when sufficient differential is obtained on the emergency piston 11 to overcome the resistance to movement of the main slide valve 23, the piston moves said slide valve to emergency position as defined by engagement of said piston with gasket 10, and in this position fluid under pressure is supplied from the emergency reservoir 3 to the brake cylinder 4 in the same manner as described in connection with the apparatus shown in Fig. 1.

Upon an inspection of Fig. 2 of the drawings, it will be noted that the initial movement of the emergency piston 11 from the normal position disconnects the quick action chamber charging port 69 from the brake pipe and that a slight further movement connects said port to the emergency valve chamber 18, and since this movement of the emergency piston upon an emergency reduction in brake pipe pressure is rapid, it will be evident that the pressures on the opposite sides of diaphragm 77 are quickly balanced in effecting an emergency reduction in brake pipe pressure so as to permit spring 100 to hold the service vent valve 82 seated and thereby ensure that the quick action chamber pressure will maintain the vent valve piston 59 in the position for holding the brake pipe vent valve 49 unseated for the desired length of time, as hereinbefore described in connection with the equipment disclosed in Fig. 1 of the drawings.

It will be evident that since the emergency piston 11 and auxiliary slide valve 24 of the equipment shown in Fig. 2 of the drawings, move only upon an emergency reduction in brake pipe pressure, and have relatively short travel, there will be less wear of said piston and valve and the parts of the device which they contact than is the case with similar parts embodied in the device shown in Fig. 1. Further, movement of an emergency piston upon a service reduction in brake pipe pressure, as occurs in the equipment shown in Fig. 1, increases the amount of fluid under pressure which has to be vented from the brake pipe by quick service operation in effecting a service application of the brakes, by an amount equal to the displacement of said piston in moving from the normal to the service position, and this additional amount of fluid under pressure on each car of a train decreases to a slight extent the rate of quick service transmission through a train. This is undesired and is avoided in the construction shown in Fig. 2 of the drawings since the emergency piston does not move upon a service reduction in brake pipe pressure.

From the above description of the two forms of the invention it will now be seen that means have been provided which are adapted to be associated with an emergency valve device, such as disclosed in the aforementioned patent, for under abnormal service conditions preventing undesired emergency operation of said device upon a service reduction in brake pipe pressure, one form of the invention embodying means which are adapted to operate to prevent emergency operation of the emergency valve device, only if the emergency valve device does not respond to a service reduction in brake pipe pressure as intended, while in the other form of the invention the emergency valve device has no service function and therefore does not operate upon a service reduction in brake pipe pressure, this function being embodied in a separate device which is dependably controlled by a smaller differential of pressures than is required to move the emergency valve device out of its normal position.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, in combination, a brake pipe, a quick action chamber, an emergency valve device subject to the opposing pressures of said brake pipe and quick action chamber, a valve for effecting the venting of fluid under pressure from said chamber to the atmosphere, and flexible diaphragm means operative upon a reduction in brake pipe pressure to effect the operation of said valve.

2. In a fluid pressure brake, in combination, a brake pipe, a quick action chamber, an emergency valve device subject to the opposing pressures of said brake pipe and quick action chamber, a valve normally seated by the pressure of fluid in said chamber and operative to effect the venting of fluid under pressure from said chamber, and flexible diaphragm means controlled by the opposing pressures of said brake pipe and chamber for effecting the operation of said valve.

3. In a fluid pressure brake, in combination, a brake pipe, a quick action chamber, an emergency valve device subject to the opposing pressures of said brake pipe and quick action chamber, a valve for effecting the venting of fluid under pressure from said chamber, a spring, and a flexible diaphragm subject on one side to the pressure in said quick action chamber and on the opposite side to the opposing pressure of said spring and brake pipe pressure and operative upon a reduction in brake pipe pressure when the quick action chamber pressure exceeds the opposing pressure to effect the operation of said valve.

4. In a fluid pressure brake, in combination, a brake pipe, a quick action chamber, an emergency valve device subject to the opposing pressures of the brake pipe and the quick action chamber and operated upon a sudden reduction in brake pipe pressure for effecting an emergency application of the brakes, means associated with said valve device for venting fluid under pressure from the quick action chamber at a service rate upon a reduction in brake pipe pressure, and an auxiliary valve device subject to the opposing pressures of the brake pipe and the quick action chamber and operative upon the creation of a predetermined differential between the pressures in said brake pipe and the quick action chamber for venting fluid under pressure from the quick action chamber to the atmosphere at a service rate.

5. In a fluid pressure brake, in combination, a brake pipe, a quick action chamber, an emergency valve device comprising a piston subject to the opposing pressures of the quick action chamber and the brake pipe, valve means operated by said piston upon an emergency reduction in brake pipe pressure for effecting an emergency application of the brakes, a flexible diaphragm of a diameter no less than that of said piston subject to the opposing pressures of the quick action chamber and the brake pipe, and valve means operated by said diaphragm upon a reduction in brake pipe pressure to vent fluid under pressure from the quick action chamber.

6. In a fluid pressure brake, in combination, a brake pipe, a quick action chamber, an emergency valve device subject to the opposing pressures of the quick action chamber and the brake pipe and operated upon an emergency reduction in brake pipe pressure for effecting an emergency application of the brakes, a valve operative to vent fluid under pressure from the quick action chamber, a spring, and a movable abutment of greater area than that within the seated portion of said valve and subject on one side to the pressure of fluid in the quick action chamber and on the opposite side to brake pipe pressure and the pressure of said spring for operating said valve to vent fluid from the quick action chamber upon a reduction in brake pipe pressure when the differential pressure between the quick action chamber and the brake pipe exceeds a predetermined amount.

7. In a fluid pressure brake, in combination, a brake pipe, a quick action chamber, an emergency valve device subject to the opposing pressures of said brake pipe and quick action chamber, a valve for effecting the venting of fluid under pressure from said chamber, flexible diaphragm means subject to the opposing pressures of the brake pipe and a chamber in which pressure of fluid varies with that in said quick action chamber, and a valve operative by said flexible diaphragm means upon a reduction in brake pipe pressure to effect venting of fluid under pressure from said quick action chamber.

8. In a fluid pressure brake, in combination, a brake pipe, a quick action chamber, an emergency valve device subject to the opposing pressures of said brake pipe and quick action chamber and adapted to operate upon a service reduction in brake pipe pressure to effect a service reduction in pressure in said quick action chamber and adapted to operate upon an emergency reduction in brake pipe pressure to effect an emergency application of the brakes, and valve means comprising a valve normally seated by the pressure of fluid in said chamber, and a movable abutment subject to the opposing pressures of said chamber and brake pipe and adapted to operate said valve upon a reduction in brake pipe pressure to effect a service reduction in pressure in said quick action chamber if said valve device does not operate upon a service reduction in brake pipe pressure before a predetermined differential between said opposing pressures is established.

9. In a fluid pressure brake, in combination, a brake pipe, a quick action chamber, an emergency valve device subject to the opposing pressures of said brake pipe and quick action chamber and adapted to operate upon a service reduction in brake pipe pressure to effect a service reduction in pressure in said quick action chamber and adapted to operate upon an emergency reduction in brake pipe pressure to effect an emergency application of the brakes, and valve means comprising a valve normally seated by the pressure of fluid in said chamber, and a movable abutment subject to the opposing pressures of said chamber and brake pipe and adapted to operate said valve upon a reduction in brake pipe pressure to effect a service reduction in pressure in said quick action chamber if said valve device does not operate upon a service reduction in brake pipe pressure before a predetermined differential between said opposing pressures is established, said valve device being operative upon a reduction in brake pipe pressure to render said valve means ineffective.

10. In a fluid pressure brake, in combination, a brake pipe, a valve device subject to the opposing pressures of the brake pipe and a quick action chamber and operative upon a reduction in brake pipe pressure when a differential is obtained between said opposing pressures which exceeds a predetermined degree to effect an emergency application of the brakes, and valve means controlled by said opposing pressures and operative upon a differential of pressures less than said predetermined differential for venting fluid under pressure from said chamber to the atmosphere at a service rate to prevent operation of said valve device upon a service reduction in brake pipe pressure, said valve means being normally operated by the pressure of fluid in said quick action chamber to close the venting communication to said chamber.

11. In a fluid pressure brake, in combination, a brake pipe, an emergency valve device comprising a piston subject to the opposing pressures of the brake pipe and a quick action chamber, valve means operative by said piston upon a reduction in brake pipe pressure when a differential is obtained between said opposing pressures which exceeds a predetermined degree to effect an emergency application of the brakes, a flexible diaphragm having an area at least equal to that of said piston and controlled by said opposing pressures and operative upon a service reduction in brake pipe pressure to effect a corresponding reduction in pressure in said chamber to prevent obtaining said predetermined differential upon effecting a service reduction in brake pipe pressure.

12. In a fluid pressure brake, in combination, a brake pipe, a valve device subject to the opposing pressures of the brake pipe and a quick action chamber and operative upon a reduction in brake pipe pressure when a differential is obtained between said opposing pressures which exceeds a predetermined degree to effect an emergency application of the brakes, a valve operative to vent fluid under pressure from said chamber at a service rate, and flexible diaphragm means controlled by said opposing pressures and operative upon a differential less than said predetermined differential to effect the operation of said valve.

13. In a fluid pressure brake, in combination, a brake pipe, a valve device subject to the opposing pressures of the brake pipe and a quick action chamber and operative upon a reduction in brake pipe pressure when a differential is obtained between said opposing pressures which exceeds a predetermined degree to effect an emergency application of the brakes, valve means controlled by said opposing pressures and operative upon a differential of pressures less than said predetermined differential to vent fluid under pressure from said chamber to the atmosphere, and means for limiting the rate at which fluid under pressure is vented from said chamber to a degree which will prevent obtaining said predetermined differential upon a service reduction in brake pipe pressure and ensure obtaining said predetermined differential upon an emergency reduction in brake pipe pressure.

14. In a fluid pressure brake, in combination, a brake pipe, a valve device subject to the opposing pressures of the brake pipe and a quick action chamber and operative upon a reduction in brake pipe pressure when a differential is obtained between said opposing pressures which exceeds a predetermined degree to effect an emergency application of the brakes, a flexible diaphragm subject to said opposing pressures, a spring acting on said diaphragm adapted to permit deflection of said diaphragm upon obtaining a differential of pressures less than said predetermined differential upon effecting a reduction in brake pipe pressure, and valve means operative by said diaphragm upon deflection thereof to vent fluid under pressure from said chamber at a rate to prevent obtaining said predetermined differential upon effecting a service reduction in brake pipe pressure.

15. In a fluid pressure brake, in combination, a brake pipe, a valve device subject to the opposing pressures of the brake pipe and a quick action chamber and operative upon a reduction in brake pipe pressure when a differential is obtained between said opposing pressures which exceeds a predetermined degree to effect an emergency application of the brakes, a flexible diaphragm subject to said opposing pressures, a spring acting on said diaphragm adapted to permit deflection of said diaphragm upon obtaining a differential of pressures less than said predetermined differential upon effecting a reduction in brake pipe pressure, a poppet valve operative by said diaphragm upon deflection thereof to vent fluid under pressure from said chamber, and means for limiting the rate at which fluid is vented from said chamber to a degree which will prevent obtaining said predetermined differential upon effecting a service reduction in brake pipe pressure.

16. In a fluid pressure brake, in combination, a brake pipe, an emergency valve device comprising a piston controlled by the opposing pressures of said brake pipe and a quick action chamber, valve means operative by said piston upon a reduction in brake pipe pressure when a differential exceeding a predetermined degree is obtained between said opposing pressures to effect an emergency application of the brakes, a flexible diaphragm having an area at least equal to that of said piston and controlled by said opposing pressures, valve means operative by said diaphragm upon obtaining a less differential between said opposing pressures upon a reduction in brake pipe pressure to reduce the pressure in said chamber at a rate to prevent obtaining said predetermined differential upon effecting a service reduction in brake pipe pressure, said emergency valve device being operative when effecting an emergency application of the brakes to render said valve means ineffective to vent fluid under pressure from said chamber.

17. In a fluid pressure brake, in combination, a brake pipe, an emergency valve device controlled by the opposing pressures of said brake pipe and a quick action chamber and operative when a differential exceeding a predetermined degree is obtained between said opposing pressures to effect an emergency application of the brakes, a valve operative to vent fluid under pressure from said chamber at a service rate, a flexible diaphragm subject to said opposing pressures, and a spring acting on said diaphragm and designed to permit deflection thereof to operate said valve upon a differential of pressures less than said predetermined differential.

18. In a fluid pressure brake, in combination, a brake pipe, an emergency valve device controlled by the opposing pressures of said brake pipe and a quick action chamber and operative when a differential exceeding a predetermined degree is obtained between said opposing pressures to effect an emergency application of the brakes, a valve operative to vent fluid under pressure from said chamber at a service rate, a flexible diaphragm subject to said opposing pressures, and a spring acting on said diaphragm and designed to permit deflection thereof to operate said valve upon a differential of pressures less than said predetermined differential, said diaphragm being of such design with respect to the pressure of said spring that variations in the internal resistance to deflection of the diaphragm will not materially affect the operating differential of said diaphragm as governed by said spring.

19. In a fluid pressure brake, in combination, a brake pipe, an emergency valve device controlled by the opposing pressures of said brake pipe and a quick action chamber and operative when a differential exceeding a predetermined degree is obtained between said opposing pressures to effect an emergency application of the brakes, a valve operative to vent fluid under pressure from said chamber at a rate to prevent obtaining said predetermined differential upon a service reduction in brake pipe pressure, and flexible diaphragm means controlled by said opposing pressures and operative upon a differential less than predetermined differential to effect the operation of said valve.

20. In a fluid pressure brake, in combination, a brake pipe, an emergency valve device controlled by the opposing pressures of said brake pipe and a quick action chamber and operative when a differential exceeding a predetermined degree is obtained between said opposing pressures to effect an emergency application of the brakes, a valve operative to vent fluid under pressure from said chamber at a rate which will prevent obtaining said predetermined differential upon effecting a service reduction in brake pipe pressure, a flexible diaphragm subject to said opposing pressures, and a spring acting on said diaphragm normally holding said valve closed with a pressure less than said predetermined differential, said diaphragm being operative to open said valve when, upon a reduction in brake pipe pressure, a differential is established between said opposing pressures which exceeds the pressure of said spring.

21. In a fluid pressure brake, in combination, a brake pipe, an emergency valve device subject to the opposing pressures of said brake pipe and a chamber and operative upon a reduction in brake pipe pressure when a differential exceeding a predetermined degree is obtained between said opposing pressures to effect an emergency application of the brakes, a valve for venting fluid under pressure from said chamber at a rate to prevent obtaining said predetermined differential upon a reduction in brake pipe pressure at less than an emergency rate, a flexible diaphragm normally subject to said opposing pressures and operative to open said valve, and a spring acting on said diaphragm and designed to permit deflection of said diaphragm upon a reduction in brake pipe pressure when a pressure differential less than said predetermined differential is obtained, said emergency valve device being operative in effecting an emergency application of the brakes to balance the opposing fluid pressures on said diaphragm to permit said spring to close said valve.

22. In a fluid pressure brake, in combination, a brake pipe, an emergency valve device subject to the opposing pressures of said brake pipe and a chamber and operative upon a reduction in brake pipe pressure when a differential exceeding a predetermined degree is obtained between said opposing pressures to effect an emergency application of the brakes, and designed to operate on a differential less than said predetermined differential to vent fluid under pressure from said chamber at a rate which will prevent obtaining said predetermined differential upon a reduction in brake pipe pressure slower than an emergency reduction, valve means controlled by said opposing pressures and operative upon a reduction in brake pipe pressure to vent fluid under pressure from said chamber to the atmosphere at a rate to prevent obtaining said predetermined differential when the reduction in brake pipe pressure is at a rate slower than an emergency rate, and means for delaying the operation of said valve means until just before said predetermined differential is obtained.

23. In a fluid pressure brake, in combination, a brake pipe, an emergency valve device subject to the opposing pressures of said brake pipe and a chamber and operative upon a reduction in brake pipe pressure when a differential exceeding a predetermined degree is obtained between said opposing pressures to effect an emergency application of the brakes, and designed to operate on a differential less than said predetermined differential to vent fluid under pressure from said chamber at a rate which will prevent obtaining said predetermined differential upon a reduction in brake pipe pressure slower than an emergency reduction, valve means operative to vent fluid under pressure from said chamber at a rate to prevent obtaining said predetermined differential upon a reduction in brake pipe pressure slower than an emergency reduction, a flexible diaphragm subject to said opposing pressures and connected to said valve, and a spring acting on said diaphragm, said spring being designed to permit operation of said diaphragm to operate said valve means when, upon a reduction in brake pipe pressure, a differential of pressures is obtained on said diaphragm which is just less than said predetermined differential.

24. In a fluid pressure brake, in combination, a brake pipe, an emergency valve device comprising a piston subject to the opposing pressures of said brake pipe and a quick action chamber, and a slide valve operative by said piston, said piston and slide valve having a normal or release position and being designed to move from said position to a service position for venting fluid under pressure from said chamber at a service rate when upon a reduction in brake pipe pressure a certain differential of pressures is obtained on said piston, and being designed to move from service position to an emergency position to effect an emergency application of the brakes when a greater differential of pressures is obtained on said piston, a movable abutment of greater area than said piston controlled by said opposing pressures, and valve means operative by said abutment, when upon a reduction in brake pipe pressure a differential of pressures just less than said greater differential is obtained, to vent fluid under pressure from said chamber at a service rate in case said emergency valve device fails to operate before said greater differential is obtained.

25. In a fluid pressure brake, in combination, a brake pipe, an emergency valve device comprising a movable abutment subject to the opposing pressures of said brake pipe and a quick action chamber, and a slide valve operative by said abutment, said abutment and slide valve having a normal or release position and being designed to move from said position to a service position for venting fluid under pressure from said chamber at a service rate when upon a reduction in brake pipe pressure a certain differential of pressures is obtained on said abutment, and being designed to move from service position to an emergency position to effect an emergency application of the brakes when a greater differential of pressures is obtained on said abutment, a poppet valve for venting fluid under pressure from said chamber at a service rate, a flexible diaphragm subject to said opposing pressures, and a spring acting on said diaphragm normally urging said poppet valve seated with a pressure just less than said greater differential, said diaphragm being operative, if, upon a reduction in brake pipe pressure, a differential is obtained between said opposing pressures which is just less than said predetermined differential, to open said poppet valve for venting fluid under pressure from said chamber, said emergency valve device being operative upon movement to emergency position, to render said poppet valve ineffective.

26. In a fluid pressure brake, in combination, a brake pipe, an emergency valve device comprising a movable abutment subject to the opposing pressures of said brake pipe and a quick action chamber, and a slide valve operative by said abutment, said abutment and slide valve having a normal or release position and being designed to move from said position to a service position for venting fluid under pressure from said chamber at a service rate when upon a reduction in brake pipe pressure a certain differential of pressures is obtained on said abutment, and being designed to move from service position to an emergency position to effect an emergency application of the brakes when a greater differential of pressures is obtained on said abutment, a poppet valve for venting fluid under pressure from said chamber at a service rate, a flexible diaphragm subject to said opposing pressures, and a spring acting on said diaphragm normally urging said poppet valve seated with a pressure just less than said greater differential, said diaphragm being operative, if, upon a reduction in brake pipe pressure, a differential is obtained between said opposing pressures which is just less than said predetermined differential, to open said poppet valve for venting fluid under pressure from said chamber, said emergency valve device being operative upon movement to emergency position to connect both sides of said flexible diaphragm to said quick action chamber to permit said spring to seat said poppet valve.

27. In a fluid pressure brake, in combination, a brake pipe, an emergency valve device comprising a movable abutment subject to the opposing pressures of said brake pipe and a quick action chamber, and a slide valve operative by said abutment, said abutment and slide valve having a normal or release position and being designed to move from said position to a service position for venting fluid under pressure from said chamber at a service rate when upon a reduction in brake pipe pressure a certain differential of pressures is obtained on said abutment, and being designed to move from service position to an emergency position to effect an emergency application of the brakes when a greater differential of pressures is obtained on said abutment, spring means associated with said piston for defining said service position and for determining said greater differential, and valve means controlled by said opposing pressures and operative by a differential of pressures just less than said greater differential to vent fluid under pressure from said chamber at a service rate in case said emergency valve device fails to operate before said greater differential is obtained.

28. In a fluid pressure brake, in combination, a brake pipe, an emergency valve device comprising a movable abutment subject to the opposing pressures of said brake pipe and a quick action chamber, and a slide valve operative by said abutment, said abutment and slide valve having a normal or release position and being movable to an emergency position for effecting an emergency application of the brakes when, upon a reduction in brake pipe pressure, a differential exceeding a predetermined degree is obtained between said opposing pressures, a valve operative to vent fluid under pressure from said chamber at a rate to prevent obtaining said predetermined differential upon a reduction in brake pipe pressure at a rate less than an emergency rate, a flexible diaphragm subject to said opposing pressures and operative upon a differential less than said predetermined differential to operate said valve, and a spring acting on said diaphragm for determining said less differential.

29. In a fluid pressure brake, in combination, a brake pipe, an emergency valve device comprising a movable abutment subject to the opposing pressures of said brake pipe and a quick action chamber, and a slide valve operative by said abutment, said abutment and slide valve having a normal or release position and being movable to an emergency position for effecting an emergency application of the brakes when, upon a reduction in brake pipe pressure, a differential exceeding a predetermined degree is obtained between said opposing pressures, a spring acting on said abutment in said normal position for determining said predetermined differential, a valve operative to vent fluid under pressure from said chamber at a rate to prevent obtaining said predetermined differential upon a reduction in brake pipe pressure at a rate less than an emergency rate, a flexible diaphragm subject to said opposing pressures and operative upon a differential less than said predetermined differential to operate said valve, and a spring acting on said diaphragm for determining said less differential.

30. In a fluid pressure brake, in combination, a brake pipe, a brake pipe vent valve device operative by fluid under pressure to effect an emergency reduction in brake pipe pressure, an emergency valve device comprising a main valve, an auxiliary valve mounted on said main valve and movable relatively thereto from a normal position to an emergency position for supplying fluid under pressure to effect the operation of said vent valve device, a piston subject to the opposing pressures of said brake pipe and a chamber and operative upon a reduction in brake pipe pressure when a differential exceeding a predetermined degree is obtained between said opposing pressures to move said auxiliary valve to said emergency position, spring means acting on said piston in the normal position thereof for defining said differential, valve means operative from said chamber at a rate adapted to prevent obtaining said predetermined differential upon a service reduction in brake pipe pressure, and a flexible diaphragm subject to said opposing pressures and operative upon a service reduction in brake pipe pressure to effect the operation of said valve means.

31. In a fluid pressure brake, in combination, a brake pipe, a flexible diaphragm subject on one face to brake pipe pressure, and on the opposite face to the pressure of fluid in a chamber adapted to be charged with fluid under pressure from said brake pipe through a restricted port, and valve means subject to the opposing pressures on said diaphragm and operative when the brake pipe pressure on one side exceeds the opposing pressure by a predetermined degree to increase the opposing pressure according to the increase in brake pipe pressure.

32. In a fluid pressure brake, in combination, a brake pipe, a flexible diaphragm subject on one face to brake pipe pressure, and on the opposite face to the pressure of fluid in a chamber adapted to be charged with fluid under pressure from said brake pipe through a restricted port, and valve means subject to the opposing pressures on said diaphragm and operative to limit the differential of pressures obtained on the opposite faces of said diaphragm to a predetermined degree, upon an increase in brake pipe pressure.

33. In a fluid pressure brake, in combination, a brake pipe, a flexible diaphragm subject on one face to brake pipe pressure, and on the opposite face to the pressure of fluid in a chamber connected through a restricted passage to another chamber adapted to be charged with fluid under pressure from said brake pipe through a restricted port, a valve operative by said diaphragm upon a reduction in brake pipe pressure to vent fluid under pressure from said chambers, and valve means controlled by the opposing pressures on said diaphragm and operative when a predetermined differential is obtained between said opposing pressures to supply fluid under pressure from said brake pipe to the first mentioned chamber at a rate exceeding the capacity of said restricted passage to permit flow of fluid under pressure from said first mentioned chamber to the second mentioned chamber, whereby the differential of pressures obtained on said diaphragm is limited to a predetermined degree upon effecting an increase in brake pipe pressure, said restricted passage having no restricting effect upon the flow of fluid under pressure between said chambers upon the operation of said valve to vent fluid under pressure therefrom.

34. In a fluid pressure brake, in combination, a brake pipe, a flexible diaphragm subject on one face to brake pipe pressure, and on the opposite face to the pressure of fluid in a chamber which is connected to another chamber adapted to be charged with fluid under pressure from said brake pipe through a restricted port, a valve operative by said diaphragm upon a reduction in brake pipe pressure to vent fluid under pressure from said chamber, valve means controlled by the opposing pressures acting on said diaphragm and operative upon an increase in brake pipe pressure, when the brake pipe pressure on one side of the diaphragm exceeds the chamber pressure on the opposite side, to supply fluid under pressure to the first mentioned chamber, means in the connection between said chambers for restricting flow of fluid under pressure in the direction from the first mentioned chamber to the second mentioned chamber when fluid under pressure is supplied to the first mentioned chamber for thereby ensuring an increase in pressure in said first mentioned chamber to limit the pressure differential obtained on said diaphragm upon an increase in brake pipe pressure, said means being ineffective to restrict flow of fluid under pressure in the opposite direction upon the operation of said valve.

35. In a fluid pressure brake, in combination, a brake pipe, a brake pipe vent valve device operative by fluid under pressure to effect an emergency reduction in brake pipe pressure, an emergency valve device comprising a main valve, an auxiliary valve mounted on said main valve and movable relatively thereto from a normal position to an emergency position for supplying fluid under pressure to effect the operation of said vent valve device, a piston subject to the opposing pressures of said brake pipe and a chamber and operative upon a reduction in brake pipe pressure when a differential exceeding a predetermined degree is obtained between said opposing pressures to move said auxiliary valve to said emergency position, spring means acting on said piston for defining said differential, valve means operative to vent fluid under pressure from said chamber at a rate adapted to prevent obtaining said predetermined differential upon a service reduction in brake pipe pressure, and a flexible diaphragm subject to said opposing pressures and operative upon a service reduction in brake pipe pressure to effect the operation of said valve means.

36. In a fluid pressure brake, in combination, a brake pipe, a quick action chamber, a valve device subject to the opposing pressures of the brake pipe and the quick action chamber and operative upon a reduction in brake pipe pressure for effecting venting of fluid under pressure from the quick action chamber to the atmosphere at a service rate, and an emergency valve device subject to the opposing pressures of the brake pipe and the quick action chamber and operative upon an emergency rate of reduction in brake pipe pressure to effect an emergency application of the brakes and to render said valve device ineffective to vent fluid under pressure from said chamber.

37. In a fluid pressure brake, in combination, a brake pipe, a quick action chamber, valve means operative to reduce the pressure in said quick action chamber at a service rate, a movable abutment subject to the opposing pressures of said brake pipe and a chamber normally charged with fluid at brake pipe pressure and operative upon a service reduction in brake pipe pressure to effect the operation of said valve means, and an emergency valve device subject to the opposing pressures of said brake pipe and quick action chamber operative upon an emergency reduction in brake pipe pressure to effect an emergency application of the brakes and to render said valve means ineffective to vent fluid under pressure from said chamber.

38. In a fluid pressure brake, in combination, a brake pipe, a flexible diaphragm subject on one face to brake pipe pressure and on the opposite face to the pressure of fluid in a chamber adapted to be charged with fluid under pressure from said brake pipe through a restricted port, and valve means subject to the opposing pressures of said brake pipe and chamber and operative when upon charging the brake pipe the brake pipe pressure on one side of said diaphragm exceeds the opposing pressure on the other side by a predetermined degree to prevent a further increase in the differential of pressures on said diaphragm.

39. In a brake system of the type including a normally charged brake pipe; a normally charged quick action chamber; an emergency piston subject to opposing pressures in said chamber and in the brake pipe; an emergency valve adapted to be actuated by said piston and arranged for limited lost motion relatively thereto; yielding means opposing such lost motion; a graduating valve coacting with said emergency valve and shiftable by said piston; a movable abutment subject to opposing pressures in said chamber and said brake pipe and more sensitive than said piston; a bleed valve for reducing said chamber pressure arranged to be actuated by said abutment; an interchangeable choke for adjusting the bleeding flow to correspond to a desired service reduction rate; and means controlling motion of said bleed valve under the urge of said abutment and arranged to cause the valve to open when brake pipe pressure is reducing at a chosen service rate and close at other times.

40. In a fluid pressure brake, the combination of a valve device comprising a quick action chamber; a brake pipe connection; a piston subject to opposing pressures in said chamber and connections; a main emergency valve and an auxiliary valve having a movement relatively to the main valve; a piston stem carried by said piston for actuating said valves; yielding means reacting between said stem and said main valve in one direction; a movable abutment subject to opposing pressures in said chamber and connection and more sensitive than said piston; a normally closed bleed valve for reducing pressure in said chamber at a service rate and arranged to be actuated by said abutment; and means controlling motion of said bleed valve to cause the valve to open under the urge of said abutment when brake pipe pressure is reducing at a service rate and close at other times.

41. In a fluid pressure brake, the combination of a valve device comprising a quick action chamber; a brake pipe connection; a piston subject to opposing pressures in said chamber and connection; a main emergency valve and an auxiliary valve having a movement relatively to the main valve; a piston stem carried by said piston for actuating said valves; yielding means reacting between said stem and said main valve in one direction; and an independent bleed valve mechanism, operable by pressure differentials between pressures in said chamber and connection insufficient to cause said piston to overpower said yielding means, said bleed valve mechanism serving in response to service reductions of brake pipe pressure to vent said chamber at a service rate.

42. In a brake system of the type including a normally charged brake pipe; a normally charged quick action chamber; a normally closed pressure operated brake pipe vent valve; an emergency piston subject to opposing pressures in said chamber and in the brake pipe; an emergency valve adapted to be actuated by said piston and arranged for limited lost motion relatively thereto, said valve having a preliminary emergency port for supplying air from the quick action chamber to operate said brake pipe vent valve; yielding means opposing said lost motion; a graduating valve coacting with said emergency valve and shiftable by the lost motion of the piston against said yielding resistance from a normal position in which it closes said preliminary emergency port to a position in which it opens the same; a movable abutment subject to opposing pressures in said chamber and in said brake pipe and more sensitive than said piston; a normally closed bleed valve for reducing said chamber pressure at a service rate; and connections whereby said bleed valve is opened by said abutment when the latter responds to reduction of brake pipe pressure at a service rate.

43. In a brake system of the type including a normally charged brake pipe; a normally charged quick action chamber; an emergency piston subject to opposing pressures in said chamber and in the brake pipe and having a stem; an emergency valve so confined by said stem as to have limited lost motion relatively thereto; yielding means mounted on said stem and opposing said lost motion; a graduating valve shiftable on said emergency valve by said stem when said lost motion occurs; a movable abutment subject to opposing pressures in said chamber and said brake pipe and more sensitive than said piston; a bleed valve for reducing said chamber pressure at a service rate and arranged to be actuated by said abutment; and yielding means resisting motion of said bleed valve and arranged to permit the valve to open when brake pipe pressure is falling at a service rate and close at other times.

44. In a brake system of the type including a normally charged brake pipe; a normally charged quick action chamber; an emergency piston subject to opposing pressures in said chamber and in the brake pipe; an emergency valve adapted to be actuated by said piston and arranged for limited lost motion relatively thereto; yielding means opposing such lost motion; a graduating valve coacting with said emergency valve and shiftable by said piston; a movable abutment subject to opposing pressures in said chamber and said brake pipe and more sensitive than said piston; a bleed valve for reducing said chamber pressure at a service rate arranged to be actuated by said abutment; and means controlling motion of said bleed valve under the urge of said abutment and arranged to cause the valve to open when brake pipe pressure is reducing at a chosen service rate and close at other times.

45. In a brake system of the type including a normally charged brake pipe; a normally charged quick action chamber; an emergency piston subject to opposing pressures in said chamber and in the brake pipe; an emergency valve adapted to be actuated by said piston and arranged for limited lost motion relatively thereto; yielding means opposing such lost motion; a graduating valve coacting with said emergency valve and shiftable by said piston; a movable abutment subject to opposing pressures in said chamber and said brake pipe and more sensitive than said piston; a normally closed bleed valve for reducing said chamber pressure at a service rate; and connections whereby said bleed valve is opened by said abutment when the latter responds to reduction of brake pipe pressure at a service rate.

46. In a brake system of the type including a normally charged brake pipe; a normally charged quick action chamber; a normally closed pressure operated brake pipe vent valve; an emergency piston subject to opposing pressures in said chamber and in the brake pipe; an emergency valve adapted to be actuated by said piston and arranged for limited lost motion relatively thereto, said valve having a preliminary emergency port for supplying air from the quick action chamber to operate said brake pipe vent valve; yielding means opposing said lost motion; a graduating valve coacting with said emergency valve, and shiftable by the lost motion of the piston against said yielding resistance from a normal position in which it closes said preliminary emergency port to a position in which it opens the same; a movable abutment subject to opposing pressures in said chamber and in said brake pipe and more sensitive than said piston; a bleed valve for reducing said chamber pressure at a service rate arranged to be actuated by said abutment; and means for controlling motion of said bleed valve under the urge of said abutment and arranged to cause the valve to open when brake pipe pressure is reduced at a service rate and close at other times.

JOSEPH C. McCUNE.

CERTIFICATE OF CORRECTION.

Patent No. 2,087,622.  July 20, 1937.

JOSEPH C. McCUNE.

It is hereby certified that error appears in the printed specification of the above numbered patent requiring correction as follows: Page 12, first column, line 30, claim 30, after "operative" insert the words to vent fluid under pressure; and that the said Letters Patent should be read with this correction therein that the same may conform to the record of the case in the Patent Office.

Signed and sealed this 5th day of October, A. D. 1937.

Henry Van Arsdale (Seal)  Acting Commisioner of Patents.